United States Patent [19]
Hayasaki

[11] Patent Number: 5,421,439
[45] Date of Patent: Jun. 6, 1995

[54] CLUTCH OF AUTOMATIC TRANSMISSION

[75] Inventor: Koichi Hayasaki, Hiratsuka, Japan

[73] Assignee: Nissan Motor Co., Ltd., Yokohama, Japan

[21] Appl. No.: 203,418

[22] Filed: Mar. 1, 1994

[30] Foreign Application Priority Data

Mar. 8, 1993 [JP] Japan .................. 5-046710

[51] Int. Cl.⁶ .......................................... F16D 25/061
[52] U.S. Cl. .................. 192/85 AA; 192/85 A; 192/106 F
[58] Field of Search ............ 192/85 A, 85 AA, 70.21, 192/106 F

[56] References Cited

U.S. PATENT DOCUMENTS

| | | | |
|---|---|---|---|
| 2,795,309 | 6/1957 | Hasbany | 192/85 AA |
| 4,325,471 | 4/1982 | Schuster | 192/85 AA |
| 4,421,218 | 12/1983 | Haight | 192/85 AA X |
| 5,281,190 | 1/1994 | Koivunen | 192/85 AA X |
| 5,305,863 | 4/1994 | Gooch et al. | 192/85 AA X |

Primary Examiner—Andrea L. Pitts
Attorney, Agent, or Firm—Foley & Lardner

[57] ABSTRACT

A clutch of an automatic transmission having a clutch drum having a fluid chamber defined therein clutch hub coaxially disposed within the clutch drum; a clutch plate pack operatively interposed between the clutch drum and the clutch hub; and a piston slidably disposed in the fluid chamber in such a manner that a movement of the piston in a given direction due to feeding of operating fluid into the fluid chamber presses the clutch plate pack. In the invention, there is provided in the clutch a fine passage which connects the fluid chamber to an open air. The fine passage is exposed to a radially inner portion of the fluid chamber, so that under rotation of the clutch drum, any remaining air is forced to move toward the fine passage by the operating fluid in the fluid chamber. The fine passage is sized to permit passing of air therethrough while blocking passing of the operating fluid.

18 Claims, 3 Drawing Sheets

CLUTCH OF AUTOMATIC TRANSMISSION

BACKGROUND OF THE INVENTION

1. Field of the Invention

The present invention relates in general to automatic transmissions, and more particularly to clutches (viz., front clutch, rear clutch, and the like) installed in the transmissions for conducting the gear change operation of the transmissions. More specifically, the present invention is concerned with the clutches of a type which can assuredly suppress air from being left in a piston operating fluid chamber of the clutch upon engagement of the clutch.

2. Description of the Prior Art

As is known, a clutch, such as front clutch, rear clutch or the like, of an automatic transmission comprises generally a clutch drum having a piston operating fluid chamber, a piston axially slidably received in the piston operating fluid chamber, a clutch hub coaxially disposed in the clutch drum, and a clutch plate pack interposed between the clutch drum and the clutch hub having one end directed to the piston. The clutch plate pack includes first and second groups of plates which are alternately juxtaposed. When the fluid chamber is fed with a pressurized operating fluid, the piston is forced to press the clutch plate pack thereby to engage the first and second groups of clutch plates. Under this engaged condition, the clutch drum and the clutch hub are united and thus can rotate together. While, when the pressurized operating fluid is drawn from the fluid chamber, the piston releases the clutch plate pack thereby to cancel the engagement between the first and second groups of clutch plates. Thus, under this disengaged condition, the clutch drum and the clutch hub can rotate separately or individually.

In order to smooth and hasten the change from the engaged condition to the disengaged condition of the clutch plate pack, some of the clutches are equipped with a so-called "air introduction system" which allows introduction of air into the fluid chamber when the pressurized operating fluid is being drawn from the fluid chamber. Of course, the system is equipped with an air discharging means through which the air is discharged from the fluid chamber when the operating fluid is fed to the fluid chamber.

However, due to the inherent construction, some of the clutches having such air introduction systems tend to have a drawback when the operating fluid is fed to the fluid chamber. That is, the air which has entered the fluid chamber can not be smoothly discharged through the air discharging means even when the operating fluid is being fed to the fluid chamber. This phenomenon induces a dull movement of the piston and thus a dull and slow engagement of the clutch plate pack, which tend to cause an undesired clutch slippage phenomenon. Thus, when practically mounted on motor vehicles, the automatic transmissions having such clutches tend to produce a marked shift shock upon gear changing. Of course, the marked shift shock quickens the abrasion of the clutches.

SUMMARY OF THE INVENTION

It is therefore an object of the present invention to provide a clutch of automatic transmission, which is free of the above-mentioned drawback.

According to a first aspect of the present invention, there is provided a hydraulically operated clutch installed in an automatic transmission, which comprises a rotatable member rotatable about a given axis and having a piston operating fluid chamber defined therein, the fluid chamber including a radially outer portion and a radially inner portion, the inner portion being positioned closer to the given axis than the outer portion; a piston slidably disposed in the fluid chamber for bringing about an engaged condition of the clutch when the fluid chamber is fed with an operating fluid; and means defining a fine passage which extends from the radially inner portion to an open air, the fine passage being so sized as to permit passing of air therethrough while blocking passing of the operating fluid.

According to a second aspect of the present invention, there is provided a clutch of an automatic transmission, which comprises a clutch drum having a fluid chamber defined therein; a clutch hub coaxially disposed within the clutch drum; a clutch plate pack operatively interposed between the clutch drum and the clutch hub, the clutch plate pack being capable of integrating the clutch drum and the clutch hub when pressed; a piston slidably disposed in the fluid chamber of the clutch drum in such a manner that a movement of the piston in a given direction due to feeding of operating fluid into the fluid chamber presses the clutch plate pack; and means for defining a fine passage which connects the fluid chamber to an open air, the fine passage being positioned in the vicinity of a radially inner portion of the clutch drum and sized to permit passing of air therethrough while blocking passing of the operating fluid.

According to a third aspect of the present invention, there is provided an automatic transmission, which comprises first and second rotation shafts which are coaxially aligned; a fixed hollow shaft coaxially disposed about the second rotation shaft; a clutch drum having a radially inner end mounted on the second rotation shaft through a spline connection, the clutch drum having a fluid chamber defined therein and having near the radially inner end a smaller cylindrical wall which is rotatably disposed on the fixed hollow shaft; means defining in the smaller cylindrical wall an operating fluid inlet/outlet port through which operating fluid is introduced into and discharged from the fluid chamber; a clutch hub having a radially inner end mounted on the first rotation shaft through a spline connection; a clutch plate pack interposed between the clutch drum and the clutch hub, the clutch plate pack being capable of integrating the clutch drum and the clutch hub when pressed; a piston slidably disposed in the fluid chamber in such a manner that a movement of the piston in a given direction due to feeding of the operating fluid into the fluid chamber through the inlet/outlet port presses the clutch plate pack; and means for defining a fine passage which connects the fluid chamber to an open air, the fine passage being positioned in the vicinity of the inner cylindrical wall of the clutch drum and sized to permit passing of air therethrough while blocking passing of the operating fluid.

DETAILED DESCRIPTION OF THE EMBODIMENTS

Figure 1:
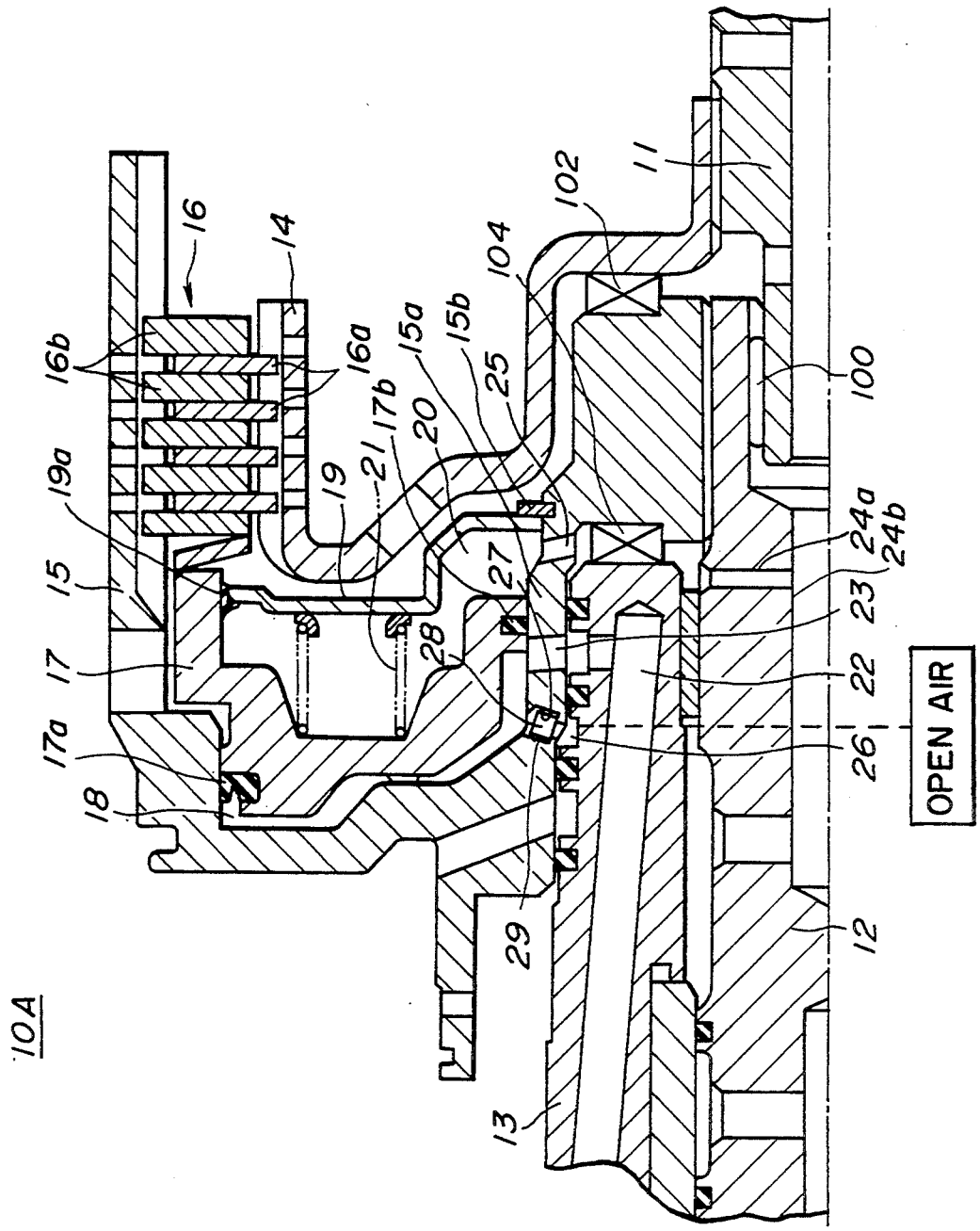
FIG. 1 is a sectional view of an upper half portion of a clutch which is a first embodiment of the present invention.

Referring to FIG. 1 of the drawings, there is shown partially, a clutch 10A of an automatic transmission, which is a first embodiment of the present invention.

The clutch 10A comprises a clutch hub 14 which is coaxially mounted at its inner end on a rotation shaft 11 through a spline connection. Thus, the clutch hub 14 and the rotation shaft 11 rotate together while permitting a slight axial displacement of the hub 14 relative to the shaft 11. A clutch drum 15 is coaxially mounted at its inner end on another rotation shaft 12 through a spline connection. Thus, the clutch drum 15 and the rotation shaft 12 rotate together while permitting a slight axial displacement of the drum 15 relative to the shaft 12. Between the rotation shaft 12 and a smaller cylindrical wall 15a of the clutch drum 15, there is coaxially disposed a hollow shaft 13 which is fixed to a transmission case (not shown). Thus, the clutch drum 15 rotates together with the rotation shaft 12, while turning around the fixed hollow shaft 13.

As shown, the two rotation shafts 11 and 12 are coaxially aligned, and they are permitted to rotate separately. A smaller diameter left end of the rotation shaft 11 is coaxially disposed through a bearing 100 in a bore formed in a right end of the other rotation shaft 12. A first annular bearing 102 is operatively disposed between the inner end of the clutch hub 14 and that of the clutch drum 15, and a second annular bearing 104 is operatively disposed between the inner end of the clutch drum 15 and an inner end of the fixed hollow shaft 13.

As shown, the clutch hub 14 and the clutch drum 15 have respective coaxial cylindrical portions which overlap each other. A clutch plate pack 16 is operatively disposed between the overlapped portions of the clutch hub 14 and the clutch drum 15. The clutch plate pack 16 comprises a plurality of first clutch plates 16a axially slidably mounted through a spline connection on an outer cylindrical surface of the clutch hub 14, and a plurality of second clutch plates 16b axially slidably mounted through a spline connection on an inner cylindrical surface of the clutch drum 15. The first and second clutch plates 16a and 16b are juxtaposed alternately.

The clutch drum 15 has a piston operating fluid chamber 18 formed therein. A piston 17 is axially movably disposed in the fluid chamber 18. First and second seal rings 17a and 17b are disposed on the piston 17 to achieve a sealing between the fluid chamber 18 and the piston 17. The piston 17 is formed, at a portion opposite to the fluid chamber 18, with a so-called centrifugal pressure canceling chamber 20 which is enclosed by a partition wall 19. As shown, the partition wall 19 has an inner end stopped by a stopper ring 15b fixed to the clutch drum 15 and an outer end connected through an elastic member 19a to the piston 17. A plurality of return springs 21 are compressed between the piston 17 and the partition wall 19, so that the inner end of the partition wall 19 is pressed against the stopper ring 15b.

The piston operating fluid chamber 18 is communicated with a pressurized operating fluid supply source (not shown) through a port 23 formed in the clutch drum 15 and an oil passage 22 formed in the fixed hollow shaft 13. The port 23 is formed in a smaller cylindrical wall 15a of the clutch drum 15, which faces or bounds a radially inner portion of the fluid chamber 18. The centrifugal pressure canceling chamber 20 is communicated with oil passages 24a and 24b through a port 25 formed in the clutch drum 15.

According to the first embodiment of the present invention, the following measure is employed.

That is, as is seen from the drawing, (viz., FIG. 1), the smaller cylindrical wall 15a of the clutch drum 15 has near the port 23 an inclined port 27 which connects the fluid chamber 18 with an annular groove 26 formed around the fixed hollow shaft 13. The annular groove 26 is connected to an air breather port which is exposed to the open air. A plug member 28 is fitted in the inclined port 27 in a manner to leave a fine clearance 29 between an outer surface of the plug member 28 and an inner surface of the inclined port 27. A known caulking technique is employed for placing the plug member 28 in position. The fine clearance 29 is about several microns to several tens of microns in size, which allows passing of air therethrough while blocking passing of the operating fluid.

In the following, operation will be described with reference to FIG. 1.

For ease of understanding, the description will be commenced with respect to a disengaged (viz., OFF) condition of the clutch 10A, which is shown in FIG. 1. Under this condition, the operating fluid is almost drawn from the piston operating fluid chamber 18 and thus the piston 17 assumes its leftmost rest position. Thus, the first and second clutch plates 16a and 16b of the clutch plate pack 16 do not engage, so that the clutch drum 15 and the clutch hub 14 are permitted to rotate individually.

When the fluid chamber 18 is fed with the operating fluid through the oil passage 22 and the port 23, the piston 17 is moved rightward against the force of the return springs 21 pressing the clutch plate pack 16. Thus, finally, the piston 17 is brought to its rightmost operative position inducing an engaged condition of the clutch plate pack 16 and thus integrating the clutch drum 15 and the clutch hub 14. Thus, the two rotation shafts 11 and 12 rotate together like a unit. That is, the clutch 10A assumes its engaged (viz., ON) condition.

During feeding of the operating fluid into the fluid chamber 18, any air in the fluid chamber 18 is discharged into the open air through the fine clearance 29 and the annular groove 26. Thus, the movement of the piston 17 from the leftmost rest position to the rightmost operative position is smoothly and quickly made.

While, when the pressurized fluid is drawn from the fluid chamber 18, the piston 17 is returned back to the leftmost rest position due to the force of the return springs 21. Thus, the clutch plate pack 16 is brought into the disengaged condition, thereby, disengaging the clutch drum 15 and the clutch hub 14. That is, the clutch 10A assumes its disengaged (viz., OFF) condition.

It is to be noted that during discharging of the operating fluid from the fluid chamber 18, it is permitted to enter the fluid chamber 18 through the annular groove 26 and the fine clearance 29. Thus, the movement of the piston 17 from the rightmost operative position to the leftmost rest position is smoothly and quickly made.

As will be seen from the above description, the movement of the piston 17 between the leftmost rest position and the rightmost operative position is smoothly and quickly made, which eliminates the undesired clutch slippage phenomenon.

When, under the disengaged condition of the clutch 10A, the clutch drum 15 is rotated, the operating fluid remaining in the fluid chamber 18 generates a centrifugal force by which the piston 17 is biased rightward. However, such biasing force applied to the piston 17 is canceled by a counter centrifugal force generated by the oil contained in the centrifugal pressure canceling chamber 20. This can solve the undesired clutch slippage phenomenon.

From the following description, an advantage given by the first embodiment 10A will be clarified.

That is, due to the provision of the fine clearance 29 at the smaller cylindrical wall 15a of the clutch drum 15, any remaining air can be smoothly drawn from the fluid chamber 18 at the time when the chamber 18 is being fed with the pressurized operating fluid. That is, under rotation of the clutch drum 15, the operating fluid tends to gather at a radially outer portion of the fluid chamber 18 pushing or forcing the remaining air toward a radially inner portion of the fluid chamber 18. This is because of the difference in specific gravity between the operating fluid (viz., oil) and air. As is known, the specific gravity of the fluid is much greater than that of air.

It is noted that forcing the remaining air toward the radially inner portion of the fluid chamber 18 means that the air is forced toward the fine clearance 29. Thus, the air can be smoothly and quickly discharged from the fluid chamber 18. In other words, feeding the fluid chamber 18 with the operating fluid for achieving the engaged condition of the clutch 10A is smoothly carried out without suffering from interference of the remaining air.

The rotation of the clutch drum 15 exhibits the air draining function also when the piston 17 is in the rest position. That is, also in this case, the remaining air is forced to gather at the radially inner portion of the contracted fluid chamber 18 because a small amount of operating fluid left in the chamber 18 is moved to the radially outer portion of the chamber 18 due to the centrifugal force applied thereto. Thus, the air can be smoothly and quickly drained through the fine clearance 29. This means that a subsequent movement of the piston 17 toward the rightmost operation position is smoothly carried out without suffering from interference of the remaining air.

Figure 2:
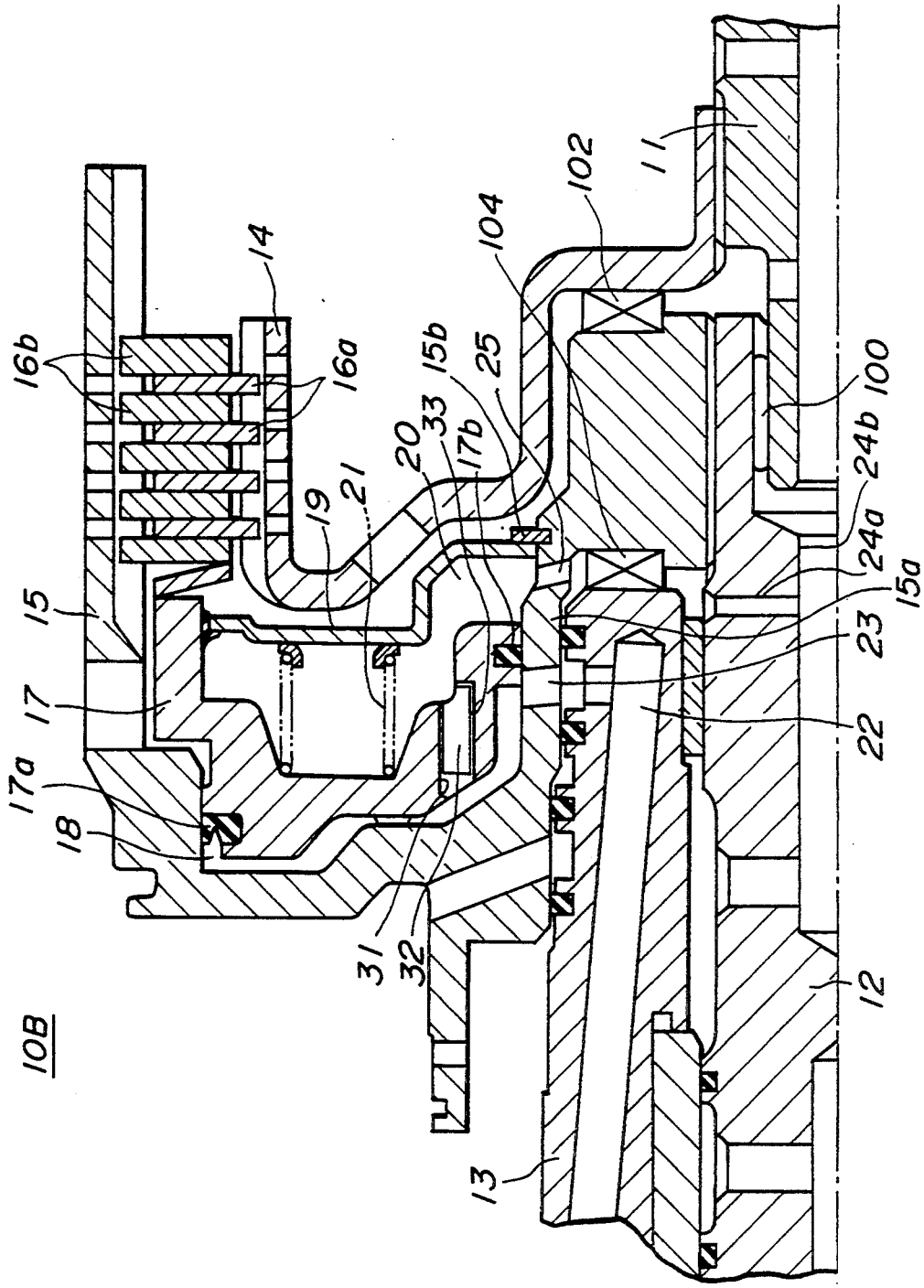
FIG. 2 is a view similar to FIG. 1, but showing a second embodiment of the present invention.

Referring to FIG. 2 of the drawings, there is shown a clutch 10B which is a second embodiment of the present invention. In this second embodiment, the centrifugal pressure canceling chamber 20 constitutes a part of an air draining passage.

Since the clutch 10B of the second embodiment is similar in construction to the afore-mentioned clutch 10A of the first embodiment, only parts and portions which are different from those of the first embodiment will be described in detail in the following. The same parts and portions as those of the first embodiment are denoted by the same numerals.

As is shown in FIG. 2, the piston 17 is formed at its radially inner portion with an axially extending bore 31 which connects the fluid chamber 18 with the centrifugal pressure canceling chamber 20. An elongate plug member 32 is fitted in the bore 31 in a manner to leave a fine clearance 33 between an outer surface of the plug member 32 and an inner surface of the bore 31. A known caulking technique is employed for placing the plug member 32 in position. The fine clearance 33 is about several microns to several tens of microns in size, which allows passing of air therethrough while blocking passing of the operating fluid.

Although not shown in the drawing (viz., FIG. 2), the oil passage 24b is connected to an air breather port which is exposed to the open air.

Under rotation of the clutch drum 15, the operating fluid tends to gather at the radially outer portion of the fluid chamber 18 pushing or forcing any remaining air toward the radially inner portion of the fluid chamber 18, that is, toward the fine clearance 33 led to the centrifugal pressure canceling chamber 20. That is, during feeding of the pressurized fluid into the fluid chamber 18 through the oil passage 22 and the port 23, the remaining air in the fluid chamber 18 can be smoothly drained to the open air through the fine clearance 33, the centrifugal pressure canceling chamber 20, the port 25, the oil passages 24a and 24b and the air breather port (not shown), which induces a smoothed and quick movement of the piston 17 to the rightmost operative position.

In the second embodiment, there is no need of providing the hollow shaft 13 with an annular groove which corresponds to the annular groove 26 used in the first embodiment. Thus, the axial length of the shaft 13 and thus that of the entire construction of the associated transmission can be reduced.

Figure 3:
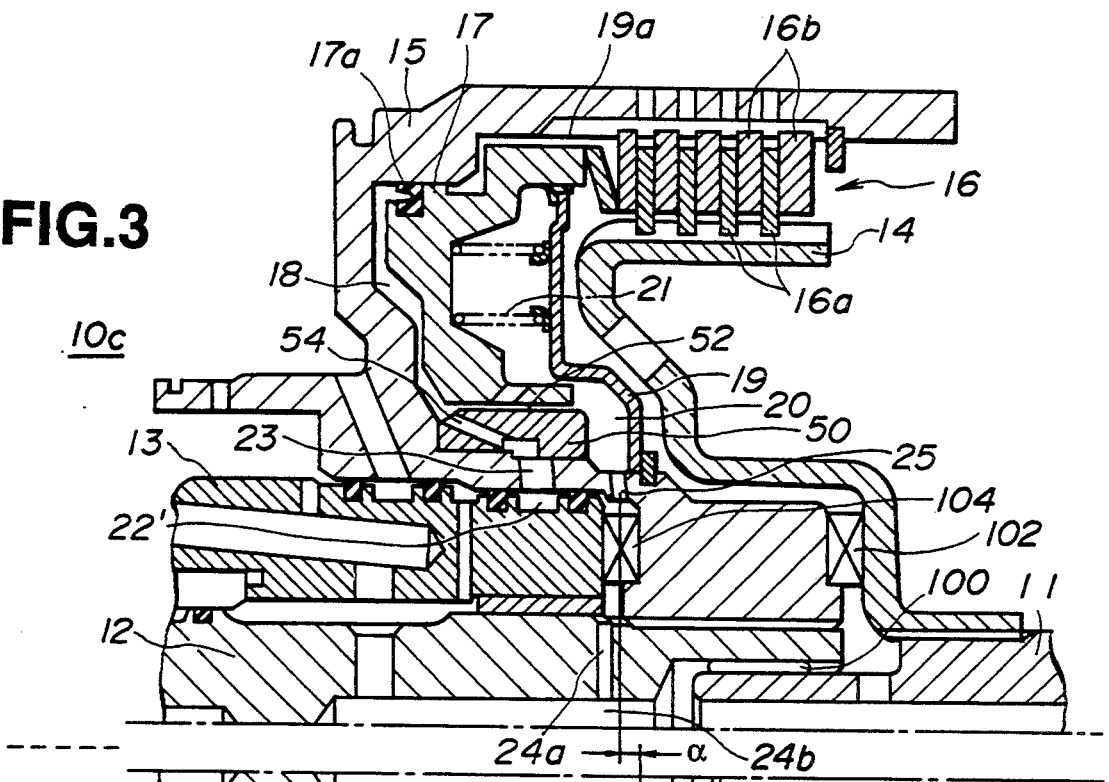
FIG. 3 is a view similar to FIG. 1, but showing a third embodiment of the present invention.

Referring to FIG. 3, there is shown a clutch 10C which is a third embodiment of the present invention. Also in this third embodiment, the centrifugal pressure canceling chamber 20 constitutes a part of the air communication passage.

Since the clutch 10C of the third embodiment is similar to the afore-mentioned clutch 10B of the second embodiment, only parts and constructions which are different from those of the second embodiment will be described in detail in the following. The same parts and portions as those of the second embodiment are denoted by the same numerals.

As is seen from FIG. 3, an adapter ring 50 is tightly and coaxially installed in a radially inner portion of the fluid chamber 18. A known press fitting technique is employed for placing the ring 50 in position. The adapter ring 50 has a cylindrical outer surface which bears an inner cylindrical surface of the piston 17. That is, upon movement of the piston 17, the inner cylindrical surface of the piston 17 slides on the fixed adapter ring 50. As shown, the sliding mating between the adapter ring 50 and the piston 17 is so made as to leave a fine clearance 52 between the cylindrical outer surface of the ring 50 and the cylindrical inner surface of the piston 17. Thus, the fine clearance 52 extends from the fluid chamber 18 to centrifugal pressure canceling chamber 20. The fine clearance 52 is about several microns to several tens of microns in size. The adapter ring 50 has a passage 54 for connecting the fluid chamber 18 to the port 23 which is led to the pressurized operating fluid supply source (not shown) through the oil passage 22' of the fixed hollow shaft 13.

Under rotation of the clutch drum 15, the operating fluid tends to gather at the radially outer portion of the fluid chamber 18 pushing or forcing any remaining air toward the radially inner portion of the fluid chamber 18, that is, toward the fine clearance 52 led to the centrifugal pressure canceling chamber 20. Thus, during feeding of the operating fluid into the fluid chamber 18 through the oil passage 22' and the port 23, the remaining air in the fluid chamber 18 can be smoothly drained to the open air through the fine clearance 52, the centrifugal pressure canceling chamber 20, the port 25, the oil passages 24a and 24b and the air breather port (not shown), which induces a smoothed and quick movement of the piston 17 to the rightmost operative position.

Figure 4:
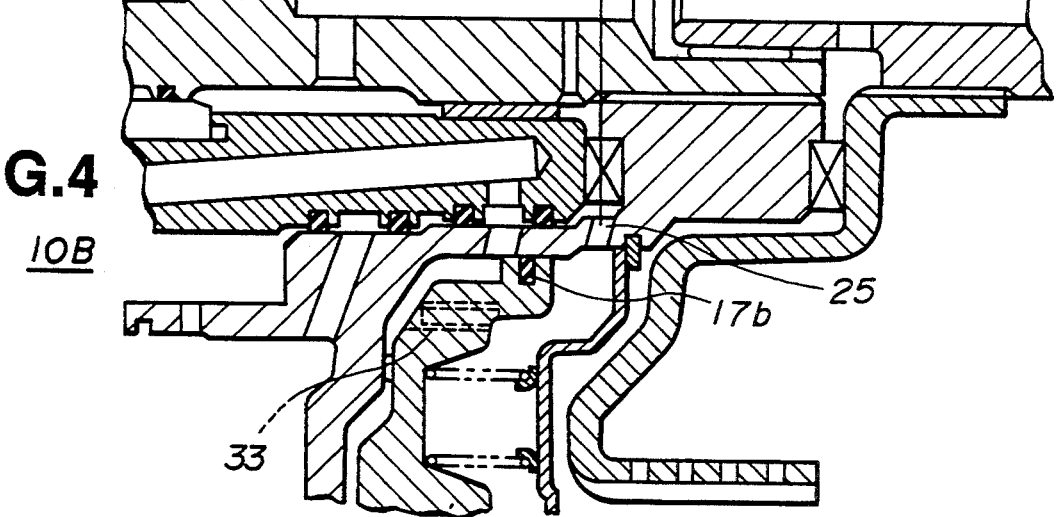
FIG. 4 is a sectional view of a lower half portion of the clutch of the second embodiment of FIG. 2, this view being provided for clarifying an advantage possessed by the third embodiment of FIG. 3.

In the third embodiment, there is no need of providing the piston 17 with a seal ring which corresponds to the seal ring 17b (see FIG. 4) used in the second embodiment. Thus, the port 25 of the third embodiment can be dislocated by the distance of "α" toward the fixed hollow shaft 13. Thus, the axial length of the entire construction of the transmission is much reduced as compared with that of he second embodiment.

What is claimed is:

1. A hydraulically operated clutch installed in an automatic transmission, comprising:
    a rotatable member rotatable about a given axis and having a piston operating fluid chamber defined therein, said fluid chamber including a radially outer portion and a radially inner portion, said inner portion being positioned closer to said given axis than said outer portion;
    a piston slidably disposed in said fluid chamber for bringing about an engaged condition of said clutch when said fluid chamber is fed with an operating fluid; and
    means defining a passage which extends from said radially inner portion to air external to said clutch, said passage being so sized as to permit passing of air therethrough while blocking passing of the operating fluid.

2. A hydraulically operated clutch as claimed in claim 1, in which said means for defining said passage comprises:
    means defining a bore in a radially inner portion of said rotatable member; and
    a plug member fitted in said bore in a manner to leave a clearance therebetween.

3. A hydraulically operated clutch as claimed in claim 1, in which said means for defining said passage comprises:
    means defining a bore in a radially inner portion of said piston, said bore connecting said radially inner portion of said fluid chamber with a centrifugal pressure canceling chamber which is provided at an opposite position of said fluid chamber with respect to said piston; and
    a plug member fitted in said bore in a manner to leave a clearance therebetween.

4. A hydraulically operated clutch as claimed in claim 1, in which said means for defining said passage comprises:
    an adapter ring tightly and coaxially installed in said fluid chamber, said adapter ring having an outer surface which slidably bears an inner surface of said piston; and
    means for defining a clearance between said outer surface of said adapter ring and said inner surface of said piston, said clearance connecting said radially inner portion of said fluid chamber with a centrifugal pressure canceling chamber which is provided at an opposite position of said fluid chamber with respect to said piston.

5. A clutch of an automatic transmission, comprising:
    a clutch drum having a fluid chamber defined therein;
    a clutch hub coaxially disposed within said clutch drum;
    a clutch plate pack operatively interposed between said clutch drum and said clutch hub, said clutch plate pack being capable of integrating said clutch drum and said clutch hub when pressed;
    a piston slidably disposed in said fluid chamber of said clutch drum in such a manner that a movement of said piston in a given direction due to feeding of operating fluid into said fluid chamber presses said clutch plate pack; and
    means for defining a passage which connects said fluid chamber to air external to said clutch, said passage being provided in a radially inner portion of said clutch drum and sized to permit passing of air therethrough while blocking passing of the operating fluid.

6. A clutch as claimed in claim 5, in which said radially inner portion of said clutch drum bounds a radially inner portion of said fluid chamber.

7. A clutch as claimed in claim 6, in which said fine passage is exposed to a part of said fluid chamber toward which any remaining air in the fluid chamber is forced to move by the operating fluid in the fluid chamber under rotation of said clutch drum.

8. A clutch as claimed in claim 7, in which a size of said passage is in the range of more than one micron to tens of microns.

9. A clutch as claimed in claim 8, in which said means for defining said passage comprises:
    means defining a port in an inner cylindrical wall of said clutch drum, said port being exposed to a passage which is led to said air external to of said clutch; and
    a plug member fitted in said port in a manner to leave a clearance between an outer surface of said plug member and an inner surface of said port.

10. A clutch as claimed in claim 8, in which said means for defining said passage comprises:
    means defining in a radially inner portion of said piston an axially extending bore which is exposed to a centrifugal pressure canceling chamber provided at an opposite position of said fluid chamber with respect to said piston; and
    an elongate plug member fitted in said axially extending bore in a manner to leave a clearance between an outer surface of said plug member and an inner surface of said bore.

11. A clutch as claimed in claim 8, in which said means for defining said passage comprises:
    an adapter ring tightly and coaxially disposed about an inner cylinder portion of said clutch drum, said adapter ring having a cylindrical outer surface which slidably bears on a cylindrical inner surface of said piston; and
    means for defining between the cylindrical outer surface of said adapter ring and the cylindrical inner surface of said piston a clearance, said clearance being exposed to a centrifugal pressure canceling chamber provided at an opposite position of said fluid chamber with respect to said piston.

12. An automatic transmission comprising:
    first and second rotation shafts which are coaxially aligned;

a fixed hollow shaft coaxially disposed about said second rotations shaft;

a clutch drum having a radially inner end mounted on said second rotation shaft through a spline connection, said clutch drum having a fluid chamber defined therein and having at said radially inner end a cylindrical portion which is rotatably disposed on said fixed hollow shaft;

means defining in said cylindrical portion an operating fluid inlet/Outlet port through which operating fluid is introduced into and discharged from said fluid chamber;

a clutch hub having a radially inner end mounted on said first rotation shaft through a spline connection;

a clutch plate pack interposed between said clutch drum and said clutch hub, said clutch plate pack being capable of integrating said clutch drum and said clutch hub when pressed;

a piston slidably disposed in said fluid chamber in such a manner that a movement of said piston in a given direction due to feeding of the operating fluid into said fluid chamber through said inlet/outlet port presses said clutch plate pack; and means for defining a passage which connects said fluid chamber to air external to said clutch, said passage being provided in said inner cylindrical wall of said clutch drum and sized to permit passing of air therethrough while blocking passing of the operating fluid.

13. An automatic transmission as claimed in claim 12, in which said cylindrical portion of said clutch drum bounds a radially inner portion of said fluid chamber.

14. An automatic transmission as claimed in claim 13, in which said passage is exposed to said radially inner portion of said fluid chamber toward which any remaining air in the fluid chamber is forced to move by the operating fluid in the fluid chamber under rotation of said clutch drum said fine passage being in the range of more than one micron too tens of microns.

15. An automatic transmission as claimed in claim 14, in which said means for defining said passage comprises:

means defining a port in said cylindrical portion of said clutch drum;

a plug member fitted in said port in a manner to leave a clearance between an outer surface of said plug member and an inner surface of said port; and means defining an annular groove on said fixed hollow shaft, said annular groove being connected to an air breather port which is exposed to said air external to said clutch.

16. An automatic transmission as claimed in claim 14, in which said means for defining said passage comprises:

means defining in a radially inner portion of said piston an axially extending bore which is exposed to a centrifugal pressure canceling chamber provided at an opposite position of said fluid chamber with respect to said piston;

an elongate plug member fitted in said axially extending bore in a manner to leave a clearance between an outer surface of said plug member and an inner surface of said bore;

passage means for feeding said centrifugal pressure canceling chamber with the operating fluid, said passage means being communicated with said air external to said clutch through an air breather port.

17. An automatic transmission as claimed in claim 14, in which said means for defining said passage comprises:

an adapter ring tightly and coaxially disposed about said cylindrical portion of said clutch drum, said adapter ring having a cylindrical outer surface which slidably bears a cylindrical inner surface of said piston;

means for defining between the cylindrical outer surface of said adapter ring and the cylindrical inner surface of said piston a clearance, said clearance being exposed to a centrifugal pressure canceling chamber provided at an opposite position of said fluid chamber with respect to said piston; and passage means for feeding said centrifugal pressure canceling chamber with the operating fluid, said passage means being communicated with said air external to said clutch through an air breather port.

18. An automatic transmission as claimed in claim 17, in which said adapter ring is formed with an oil passage through which said fluid chamber and said inlet/outlet port are connected.

* * * * *